May 5, 1953 P. M. G. TOULON 2,637,837
INDUSTRIAL SYSTEM OF VOLTAGE RECTIFICATION BY MEANS OF
RECTIFYING TUBES PROVIDED WITH A CONTROL GRID
Filed Aug. 4, 1947 3 Sheets-Sheet 1
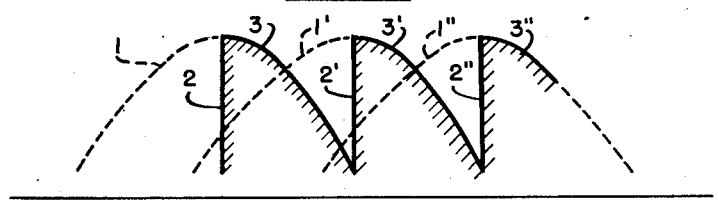
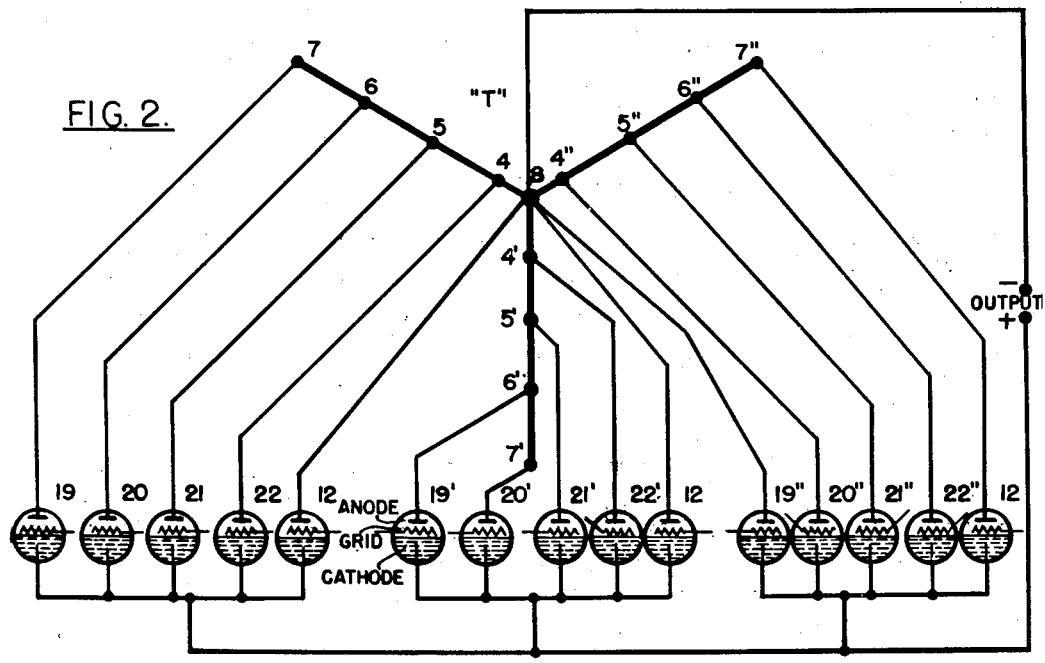
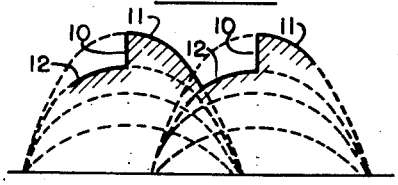
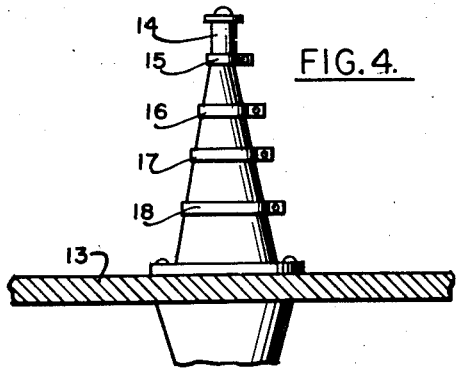
INVENTOR
P. M. G. TOULON
BY
ATTORNEYS May 5, 1953

P. M. G. TOULON 2,637,837

INDUSTRIAL SYSTEM OF VOLTAGE RECTIFICATION BY MEANS OF
RECTIFYING TUBES PROVIDED WITH A CONTROL GRID

Filed Aug. 4, 1947

INVENTOR
P. M. G. TOULON

BY Moore & Hall

ATTORNEYS

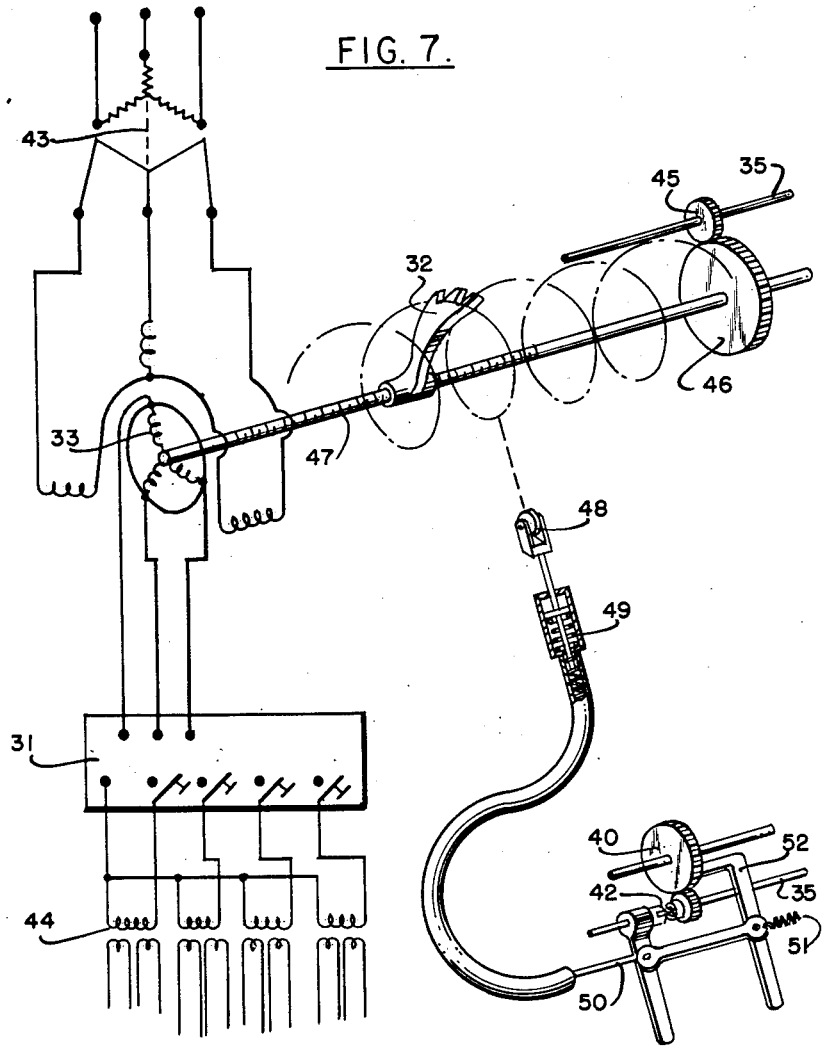

Patented May 5, 1953

2,637,837

UNITED STATES PATENT OFFICE 2,637,837

INDUSTRIAL SYSTEM OF VOLTAGE RECTIFICATION BY MEANS OF RECTIFYING TUBES PROVIDED WITH A CONTROL GRID

Pierre Marie Gabriel Toulon, Paris, France, assignor to Products & Licensing Corporation, New York, N. Y., a corporation of Delaware Application August 4, 1947, Serial No. 766,031
In France January 17, 1942

Section 1, Public Law 690, August 8, 1946
Patent expires January 17, 1962

21 Claims. (Cl. 321—21)

My invention relates to a new process for improving the shape of the rectified current supplied by mercury arc rectifiers provided with a control grid, or by any similar industrial rectifiers, and it relates more particularly to devices in which it is aimed at controlling in a progressive manner the voltage between zero and a maximum value.

It is known to supply the grid with an alternating tension having the same frequency as the voltage applied to the anodes, but suitably out-of-phase with reference to the said voltage, the result being a progressive control of the rectified current from zero up to its maximum intensity; but the shape of the current thus obtained is extremely defective, especially if the number of the anodes of the rectifiers is low and the phase lag of the grid voltage appreciable. The voltage supplied by the rectifier to the load circuit, then very abruptly passes from an expected zero value to a value which can reach 80% of the voltage, for instance, in the case of a 3 phase system, and still 50% of the voltage in the case of an hexaphase system.

The voltage surges thus produced in the A. C. network are extremely high in magnitude and the rectified current obtained comprises a very large A. C. component, which entails the necessity of a considerable filtering.

My invention makes it possible to obtain a current which is much more regular, with no necessity to use many rectifiers; it reduces the amount of the voltage variations; it consists in disposing, on each one of the windings of the transformer supplying current to the rectifiers, auxiliary taps carried to increasing voltages. The highest voltage is first rectified, and in the tube which carries out that rectification the current is progressively reduced; then the smaller voltage corresponding to the next tap is similarly rectified by means of another tube, loaded progressively in connection with the said tube, and so on.

Another object of my invention is to so connect the improved above mentioned devices as to reduce the number of the rectifying tubes. To that end, the tube which has rectified the voltage on one of the transformer taps (the current is progressively reduced to zero) is commuted and transferred to a tap of lower voltage, belonging for instance to another phase; while the following tap of the first phase is connected to another tube which had previously supplied another phase and had become free. The commutation is effected by a set of sectional switches controlled in an appropriate manner, preferably by the device itself which controls the apparatus used for changing the lag in phase of the grids.

Another object of my invention consists of a form of realisation of the above mentioned distributor so that it performs the duty of both the commutation of the rectifiers and the control of their grid voltage and phase.

For a better understanding of my invention I have illustrated in the appended drawings the characteristic features of its forms of realisation, in connection with a description dealing with instances of application which are illustrative, and non-limitative, of its scope.

Fig. 1 illustrates the shape of the current obtained by means of a "thyratron" device of the classical type, controlled by changing the phase of the grid.

Fig. 2 is a diagram of connections made in accordance with my invention, and which includes a number of rectifying tubes, each one of them so controlled that the D. C. obtained can be varied in a very progressive way, thus avoiding the production of jerks or surges.

Fig. 3 shows the shape of the rectified current obtained with the device represented in Fig. 2.

Fig. 4 shows the type of binding post adopted as output terminal, with the obvious advantages that it simplifies the execution of the wiring and reduces the cost of the insulators.

Figure 5:
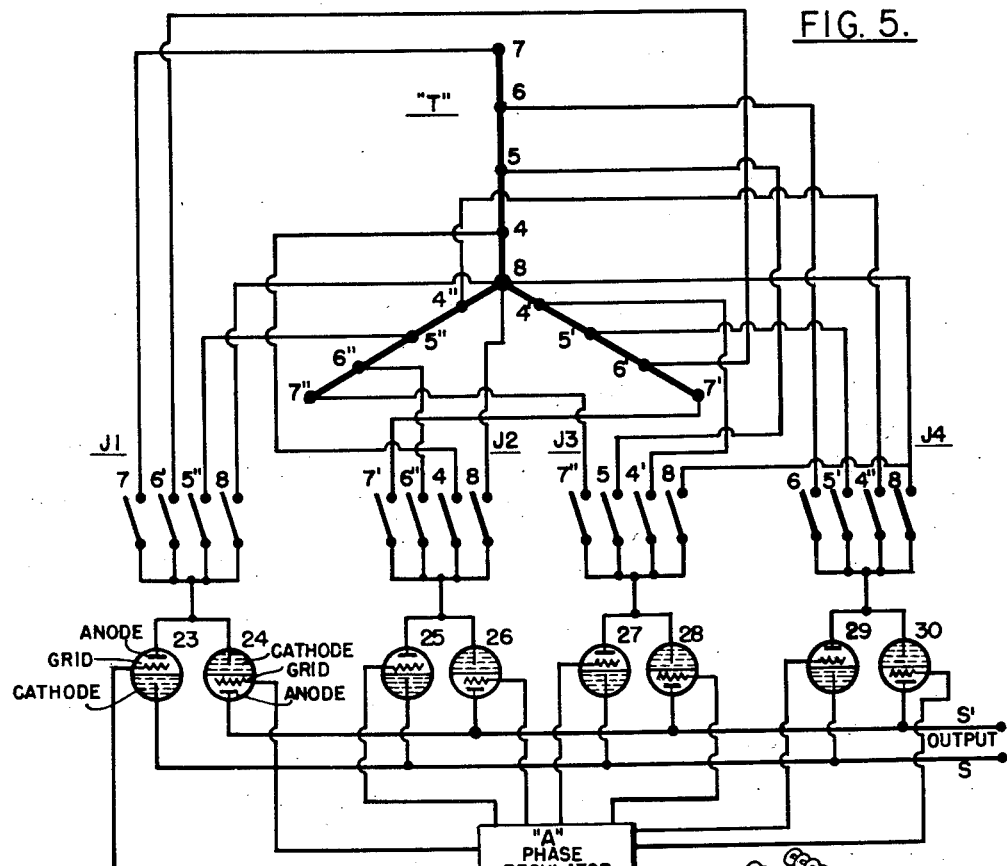

Fig. 5 gives an instance of an improved wiring diagram, applying to the case of a voltage doubler, an obvious advantage of which is to reduce the number of the discharge tubes; a very satisfactory hexaphase system is thus realised by the use of only 8 tubes.

Figure 6:
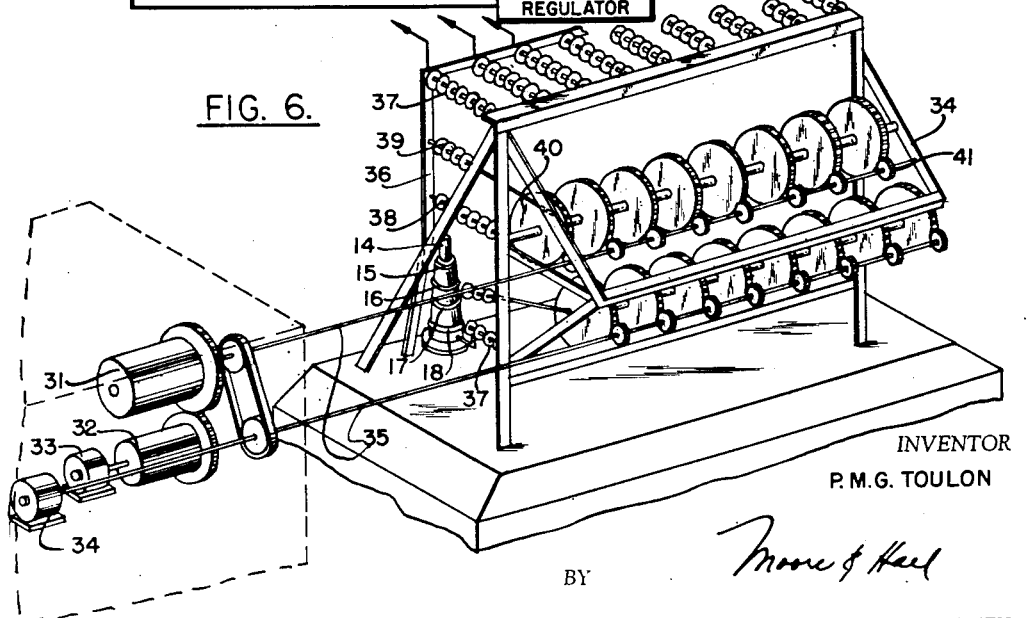

Fig. 6 is a perspective view of the general dispositions of an improved sectional switch designed for automatically connecting up the various tubes to the successive terminals of the supply transformer.

Fig. 7 is a detail view of the mechanical means adopted for successively throwing into service with the desired connections, the sectional switches of Fig. 6.

As shown in Fig. 1, a polyphase rectifier (hexaphase in general) gives a rectified current of a satisfactory shape when the grid voltages are so controlled that they are in phase with the anode voltages, as is the case for the curves I, I', I''. On the contrary, when the phase difference is made rather large between the grid and the anode voltages (so as to reduce the mean value of the terminal voltage across a resistance load), a substantially sawtooth current is obtained which is very defective, and wherefrom result large harmonics for the D. C. as well as the A. C. circuits; the representative curve of that current is, as shown in Fig. 1, a succession of straight segments such as 2; 2', 2", ... and of sinusoidal sections such as 1, 1', 1" ... What makes the curve of Fig. 1 particularly defective is, above all, the abrupt starting of the output current of the rectifier at points 2, 2', 2", with the result that appreciable voltage differences or surges occur in the corresponding voltages.

For eliminating that drawback, according to Fig. 2, I provide a large number of taps on the supply transformer, which for instance has a 3 phase star-connected secondary winding with its neutral at point 8. On branch 7 are disposed, for instance, three auxiliary taps 4, 5, 6 on the branch 7', the taps 4', 5', 6', and on the third branch 7" the taps 4", 5", and 6". Instead of one rectifier per phase or branch of the above secondary of transformer (as would be the usual practise), I make use, on each branch, of 5 independent rectifiers, forming three groups and provided with individual connections to the various taps and to the terminals (outside and neutral) of the transformer, as shown in Fig. 2.

If the grids of each one of those tubes are so disposed that no difference in phase exists between their potentials and the anode voltage, output currents are only delivered by the rectifiers 19, 19' and 19" since they receive the maximum anodic voltage.

If I maintain exactly in phase the grids of the tubes 20, 21, and 22, while bringing out of phase the grids of the tubes 19, 19', and 19", it may happen that therefrom results a progressive reduction in the voltage of the load circuit, but the shape of hte current curve is far more satisfactory than it would be if the rectifiers 20, 20', 20" were omitted.

From the Fig. 3, which shows the curves of current corresponding to the diagram of connections of Fig. 2, it is easy to see that the irregularities of the curves of Fig. 1 are corrected to a large extent. The sinusoidal segment 11 corresponds to the tap 7 and is all that remains of the initial sinusoid of Fig. 1, while the vertical segment 10 shows what remains of the vertical segments 2 which in Fig. 1 corresponded to the abrupt falls of intensity and were the main source of objectionable surges.

When, in turn, the tubes 19, 19', 19" are put out of service, and while the tubes 20, 20', 20" have their grids brought slightly out of phase, the grids which are now in-phase with the anode are the grids 21, 21', and 21", which, in consequence, deliver the maximum output current.

The change in phase is progressively applied to the potentials of the grids 20, 20', 20", which operation has the effect of reducing their current; and when they no longer have any anode current the same "dephasing" operation is practiced on the grids 21, 21' and 21".

Besides the resultant curve obtained from the association of tubes shown in Fig. 2, the Fig. 3 shows in dotted lines the individual curves which are adding their effects so as to give the improved results shown.

The winding under consideration may be realised in a very simple manner, with no necessity to introduce delicate inside connections into the transformer as is the case when having to multiply the number of the anodes (for instance in the case of a star-polygonal diagram of connections).

Moreover, the applications of binding-posts such as the one represented in Fig. 4 results in reducing the number of the output insulators to its minimum (3 pieces being sufficient for the whole of the connections). The binding-post under consideration is of the oil type: its oil chamber is shown in 14, its main terminal in 15, and the intermediate taps of the transformer correspond to the intermediate terminals of the binding-post, carried by the respective collars 16, 17 and 18, set at proper intervals along the porcelain body of the device.

The above described apparatus offers the inconvenience of requiring a rather large number of tubes. In another form of application of my invention, the tubes are so connected that it becomes possible to reduce their number, by keeping them in service when they deliver a useful current, a commutating system being added to the installation for connecting the tubes to the proper terminals of circuits in proportion of the needs.

The diagram of wiring of Fig. 5 applies to the case of an hexaphase distribution, obtained from an ordinary star-transformer. The tubes 23 and 24 are connected in series, and the same connection applies to the other couples of tubes: 25—26, 27—28, 29—30. While an ordinary distribution would necessitate three groups of such tubes, I make use of one more group. The load (or impedance of charge) is connected to the terminals S—S' (Fig. 5). The common A—K or anode-cathode terminal of each group is connected to a system of sectional switches, so adapted as to make the successive connections needed of the tubes to the various terminals of the transformer 7, 6, 5, 4, and 8. The multiple sectional switch J1 is so combined as to connect the couple of tubes 23—24, either to the terminal 7, or to terminal 6', or to terminal 5", or lastly to the neutral terminal 8 of the transformer (two of those terminals corresponding to intermediate taps on two of the phases of the transformer, the two others corresponding to the end terminal and the neutral point of the third branch or phase).

Similarly the sectional switch J2 can connect its group of two tubes (25—26) to terminals 7', 6", 4 and 8.

The sectional switch J3 can connect the third group of tubes (27—28) to 7", 5, 4', and 6; and the switch J4 can connect its group of two tubes to terminals 6, 5', 4" and 8.

At first the grid potentials in all the tubes are left "in-phase" with reference to the anode, so as to have the maximum tension in the utilization circuit: the sectional switches 7, 7', 7" and 6 are all closed, while all the others are open. As the group 29—30 is at a lower voltage, it has no output current.

Then the phase of the grid tension of the tubes 23—24, now connected to tap 7, is so regulated that the group 29—30, connected to tap 6, takes progressively the place of the preceding one.

This change is very progressively made, and during all the time the D. C. tension produced decreases regularly.

When the tubes 23—24 have ceased to deliver current, the tap 6 connection is cut out and 7 takes its place.

The group 23—24, now free, is thus commuted and connected to the tap 6' belonging to another phase of the transformer. That permits to progressively reduce the current delivered by the group 25—26, connected by the switch 7' to the tap 7' of that last phase of the transformer, and to replace it progressively by the commuted group 23—24. As the current of the group 25—26 is reduced to zero, the switch cuts out with no current, consequently without any sparks or surge of tension, and the closing of the switch 6" has as a result, the commutation of the free group 25—26 onto the tap 6" of another transformer phase; the same operation is then made on group 27—28, and so on . . . Thus are rectified, by successive stages, the fractions of the tensions for each phase, by commuting the groups of tubes while at the same time controlling the phases and the potential of their grids.

The same operation can then be made for the tubes 25—26, thus allowing to release the connection 7' and to establish the connection 8", and so on.

It is easy to understand that such a process allows to pass from the maximum voltage to zero in a very progressive way.

Fig. 6 shows a perspective of a sectional switch system which can be used for automatically making the connections described with reference to Fig. 5. The porcelain insulators 37 and 38, set on a metallic frame 34, carry the sectional switches 36. The blades of the said switches are operated by insulated connecting rods 39, which receive their movement as secondary cranks, from a gear wheel 40.

All wheels such as 40 are geared with respective small pinions 41, which are all mounted on a common shaft 35, and the electric motor 34 rotating the said shaft has a direction of rotation electrically controlled. Each one of the pinions 41 can be coupled with the shaft 35 at the desired moment, by means of a cog-wheel and pawl system shown in Fig. 7, and by means of a distributor 32, Fig. 6, the clutching or locking operations are produced in succession, in the desired order.

What I claim is:

1. In a system for progressively varying the output of a rectifier system supplied with voltage from a plural phase transformer, each of the phases of said transformer providing a plurality of output terminals at successively lower voltage, and wherein said rectifier system comprises a plurality of rectifier pairs connected back to back, means successively reducing the current in different of said pairs to a minimum, and means for connecting each of said pairs in succession to different ones of said phases after the current in said pair has been reduced to said minimum.

2. In a system for progressively varying the output of a rectifier system supplied with voltage from a plural phase transformer having a neutral connection common to said phases, each of said phases providing a plurality of output terminals at a plurality of different voltages, said rectifier system comprising a plurality of gaseous conduction electronic valves having each a control electrode, means for connecting one of said valves to a terminal of one of said phases, said last mentioned terminal having a predetermined voltage, means for connecting each of the remainder of said plurality of valves to a terminal of a different one of said phases, said last named terminals having each a voltage higher than said predetermined voltage, means progressively reducing the output of each of said valves to a minimum, and switching means respectively connecting each of said valves to a terminal different than that to which it was originally connected, after the output of said valve has been reduced to said minimum.

3. In a system for progressively varying the output of a rectifier system supplied with voltage from a plural phase transformer having a neutral connection common to said phases each of said phases provided with a plurality of output terminals at a plurality of different voltages, said rectifier system comprising a plurality of gaseous conduction electronic valves having each a control electrode, means for connecting one of said valves to a terminal of one of said phases, said last mentioned terminal having a predetermined voltage, means for connecting each of the remainder of said plurality of valves to a terminal of a different one of said phases, said last named terminals having each a predetermined voltage higher than said predetermined voltage, means for reducing the output of one of said remainder of said plurality of valves progressively to zero and for then disconnecting said last mentioned valve, and means for reconnecting said one of said remainder of said plurality of valves to a terminal of said predetermined voltage.

4. In a system for progressively varying the output of a rectifier system supplied with voltage from a polyphase transformer having a neutral connection common to said phases, each of said phases providing a plurality of output terminals at a plurality of different voltages, said rectifier system comprising a plurality of back-to-back connected gaseous conduction electronic valves having each a control electrode, a load, means for connecting one of said plurality of pairs between a terminal of one of said phases at a first voltage, and said load, means for connecting the remainder of said pairs of valves each between a terminal of one of said phases and said load, said last mentioned terminals being all of the same voltage, phase shift means for applying progressively phase shifted voltage to said control electrodes of said remainder of said pairs of valves to cut off said remainder of said pairs of valves, and means for cyclically connecting each pair of valves when cut-off to a succeeding phase of said polyphase transformer and to successively reduced voltage terminals thereof.

5. In a system for progressively varying the output of a rectifier system supplied with voltage from a plural phase transformer having a neutral connection common to said phases, each of said phases providing a plurality of output terminals at a plurality of different voltages, said rectifier system comprising a plurality of pairs of gaseous conduction electronic valves having each a control electrode, means for connecting said pairs of gaseous conduction electronic valves, one pair to a terminal of a first voltage of one of said phases and each remaining pair to a different terminal of identical voltage of each of said phases, means successively reducing the output of each of said pairs to a minimum, and means switching each of said pairs to a different output terminal when the output of said pair reaches said minimum.

6. In a system for progressively varying the output of a rectifier system supplied with voltage from a plural phase transformer having a neutral connection common to said phases, each of said phases providing a plurality of output terminals at a plurality of different voltages, said rectifier system comprising a plurality of gaseous rectifier pairs, said plurality equal to one more than the number of said phases, means for maintaining one of said pairs connected to a terminal at a first voltage and the remainder of said pairs each to a separate one of said phases, and to terminals of said phases having a voltage higher than said first voltage while cyclically interchanging the connections of said pairs to said terminals and said phases.

7. In a current control system, a source of alternating current having phases numbered 1 to $n$, each of said $n$ phases provided with terminals numbered 1 to $m$, $n+1$ gaseous conduction means, each of said gaseous conduction means having means for gradually varying its conduction from full value to zero, a load, and means for interconnecting each of said gaseous conduction means selectively between a differently numbered terminal of each of said $n$ phases and said load.

8. The combination in accordance with claim 7 wherein each of said gaseous conduction means is an inverse parallel connected pair of gaseous conduction valves.

9. The combination in accordance with claim 8 wherein each of said gaseous conduction means includes a gaseous conduction valve.

10. A system for rectifying alternating voltage supplied to a load, comprising, $n$ phases of a source of alternating voltage, where $n$ is an integer, means providing for each of said phases at least two voltage terminals of a first higher and a second lower predetermined voltage, a separate first grid controlled gaseous conduction device connected intermediate each of said terminals of higher predetermined voltage and said load, a further grid controlled gaseous conduction device connected between the terminal of second lower predetermined voltage of the $n$th phase and said load, and means for gradually reducing to zero current flow in the first grid controlled gaseous conduction device connected intermediate the $n$th phase and said load, and a switch for thereafter disconnecting said last mentioned gaseous conduction device from said source.

11. The combination in accordance with claim 10 wherein said gaseous conduction devices are inverse parallel connected gaseous conduction valves.

12. In a current control system, a source of alternating current having a plurality of phases, each of said phases having a plurality of output terminals of different voltage, a load, a plurality of gaseous conduction devices of number one greater than the number of phases in said plurality of phases, means for continuously transferring current from all but one of said phases to said load via only one gaseous conduction device and from said one of said phases via two of said gaseous conduction devices, means for gradually reducing to zero current flow via one of said last mentioned gaseous conduction devices, and means for thereafter interconnecting said one of said last mentioned gaseous conduction devices in conductive condition intermediate another than said one of said phases and said load.

13. In combination, a load, an $n$ phase source of alternating current having phases 1 to $n$ inclusive, $n$ an integer, each of said phases provided with $m$ terminals 1 to $m$, inclusive, and each terminal 1 to $m$ of a given phase of a different predetermined voltage, $n+1$ gaseous conduction devices 1 to $n+1$, inclusive, each having a control electrode means, means for applying control voltage to said control electrode means for individually controlling firing times of said gaseous conduction devices, means for connecting each of $n$ of said gaseous conduction devices intermediate a different terminal $m$ and said load and the $(n+1)$ gaseous conduction device to terminal $m-1$ of phase $n$, means for gradually varying firing times of the gaseous conduction device connected intermediate terminal $m$ of phase $n$ and said load to cut off, means for switching the cut off tube intermediate a terminal $m-1$ of phase $n-1$ and for adjusting firing times thereof to conductive condition, and means for thereafter gradually varying firing times of the gaseous conduction device connected intermediate terminal $m$ of phase $n-1$ and said load until said last mentioned gaseous conduction device is cut off.

14. In combination, a rectifier system comprising a load, an $n$-phase source of alternating current, each phase comprising a plurality of voltage terminals of different voltage, $n+1$ gaseous conduction devices coupled to terminals of said source, each of said devices having a control grid, means for energizing said grids in individually controllable phase, said last named means successively reducing the output of each of said devices to a minimum, and means successively connecting the gaseous conduction device at said minimum output intermediate a different terminal of said source and said load.

15. In a system for gradually varying flow of rectified current between a polyphase source and a load, a separate first gaseous conduction device connected intermediate each phase of said source and said load, said devices all connected to a point of substantially identical voltage of said phases, a further gaseous conduction device connected intermediate one phase and said load at a point of reduced voltage of said phase, means for reducing to zero current flow in the first gaseous conduction device connected to said one phase, means for thereafter connecting said last mentioned gaseous conduction device intermediate a further phase and said load at a point of reduced voltage and in conductive condition, and means for thereafter reducing to zero current flow in the first gaseous conduction device connected intermediate said further phase and said load.

16. A system for rectifying alternating voltage, comprising, a source of alternating voltage having phases 1, 2 . . . $n$, each of said phases having a first terminal at a first predetermined voltage and a second terminal at a second predetermined voltage, a load, $n$ first gaseous conduction devices each connected intermediate a separate one of said first terminals and said load, one second gaseous conduction device connected intermediate the second terminal of phase $n$ and said load, means for gradually reducing current flow intermediate the first gaseous conduction device connected to the first terminal of phase $n$ to zero while maintaining current flow in said second gaseous conduction device, means for thereafter disconnecting said last mentioned first gaseous conduction device from said first terminal of phase $n$ and connecting said last mentioned first gaseous conduction device to a second terminal of one of the phases 1 to $n-1$ in conductive condition and means for thereafter gradually reducing to zero current flow in the first gaseous conduction device connected intermediate the first terminal of said last mentioned phase and said load.

17. In a rectifier system, a multiphase source of alternating voltage, a load, at least one gaseous conduction rectifier device connected intermediate each phase of said multiphase source and said load, means comprising an auxiliary gaseous conduction device coupled to one of said phases for varying current flow between said phase of said multiphase source and said load in a plurality of discrete time separated steps, and means for varying the current flow in each of said discrete steps from all said phases in time succession.

18. In a system for controllably rectifying alternating current, a load, a source of multiphase alternating voltage, of $n$ phases, $n+1$ gaseous conduction devices connected respectively one between each phase of said source and said load, and the remaining one connected between one of said phases and said load, means for reducing current flow between said one of said phases only and said load by controlling one of said gaseous conduction devices, means for thereafter interchanging said gaseous conduction devices to provide two gaseous conduction devices between another of said phases and said load, and means for reducing current flow between said another of said phases and said load by controlling at least one of said last mentioned two gaseous conduction devices.

19. In a system for controllably rectifying multiphase alternating current, a load, a multiphase source of alternating current, at least one gaseous conduction device interposed between each phase of said multiphase source and said load, means for controlling each of said gaseous conduction devices to transfer current of substantially the same first predetermined magnitude, means for varying current transfer through said gaseous conduction devices in sequence from said predetermined magnitude to a second predetermined magnitude, and thereafter from said second predetermined magnitude in sequence to a third predetermined magnitude.

20. In a system for controllably rectifying multiphase alternating current by means of a plurality of gaseous conduction devices, a source of multiphase alternating current, a load circuit, at least one gaseous conduction device interposed between each of the phases of said source of multiphase alternating current and said load, a further conduction device between one of said phases and said load, and means for effecting a step-by-step control of the flow of current in said phases comprising means reducing the current flow in said further conduction device, and means then coupling said further conduction device to a different one of said phases 21. A system for progressively varying the output of a rectifier system comprising a transformer having a plurality of output terminals each at a different voltage of identical phase, said plurality comprising at least three, a plurality of gaseous rectifier devices each having a control electrode, switching means periodically coupling said rectifier devices to different of said terminals in rectifying relation with each of said terminals, means for applying to the control electrode of one only of said devices connected to the output terminal of highest voltage a phase shiftable control potential to vary the output of said one of said devices, means for progressively shifting the phase of said phase shiftable control potential, means for applying to the control electrodes of the remainder of said plurality of devices control potentials adapted to establish outputs therefrom, and means for maintaining constant said last mentioned control potentials during said progressive shifting.

PIERRE MARIE GABRIEL TOULON.

References Cited in the file of this patent

UNITED STATES PATENTS

| Number | Name | Date |
|---|---|---|
| 1,893,784 | Prince | Jan. 10, 1933 |
| 1,937,371 | Willis et al. | Nov. 28, 1933 |
| 2,016,148 | La Roque et al. | Oct. 1, 1935 |
| 2,093,197 | Kern | Sept. 14, 1937 |
| 2,093,220 | Widmer | Sept. 14, 1937 |
| 2,093,222 | Winograd | Sept. 14, 1937 |
| 2,098,182 | Dortort | Nov. 2, 1937 |
| 2,113,220 | Power | Apr. 5, 1938 |
| 2,140,377 | De Blieux | Dec. 13, 1938 |

FOREIGN PATENTS

| Number | Country | Date |
|---|---|---|
| 782,352 | France | Mar. 18, 1935 |